United States Patent
Tao (10) Patent No.: US 9,445,124 B2
(45) Date of Patent: Sep. 13, 2016

(54) ELECTRONIC SYSTEM WITH FREQUENCY MECHANISM AND METHOD OF OPERATION THEREOF

(71) Applicant: Samsung Electronics Co., Ltd., Suwon-si, Gyeonggi-Do (KR)

(72) Inventor: Li Tao, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 209 days.

(21) Appl. No.: 14/211,832

(22) Filed: Mar. 14, 2014

(65) Prior Publication Data

US 2014/0267604 A1    Sep. 18, 2014

Related U.S. Application Data

(60) Provisional application No. 61/794,627, filed on Mar. 15, 2013, provisional application No. 61/892,397, filed on Oct. 17, 2013.

(51) Int. Cl.
| | |
|---|---|
| *H04N 19/00* | (2014.01) |
| *H04N 19/61* | (2014.01) |
| *H04N 19/593* | (2014.01) |
| *H04N 19/48* | (2014.01) |
| *H04N 13/00* | (2006.01) |
| *H04N 13/04* | (2006.01) |

(52) U.S. Cl.
CPC ............ *H04N 19/61* (2014.11); *H04N 19/48* (2014.11); *H04N 19/593* (2014.11); *H04N 13/0048* (2013.01); *H04N 13/04* (2013.01)

(58) Field of Classification Search
CPC ........................................................ H04N 19/48
USPC ................................................... 375/240.25
See application file for complete search history.

(56) References Cited

U.S. PATENT DOCUMENTS

| | | |
|---|---|---|
| 6,917,384 B1 * | 7/2005 | Fukushima ............ H04N 1/215 348/222.1 |
| 2008/0285873 A1 | 11/2008 | Ando et al. |
| 2009/0067491 A1 | 3/2009 | Sun et al. |
| 2009/0238484 A1 | 9/2009 | Xu et al. |
| 2010/0272184 A1 | 10/2010 | Fishbain et al. |
| 2012/0106637 A1 | 5/2012 | Lee et al. |
| 2012/0294365 A1 | 11/2012 | Zheng et al. |
| 2013/0028538 A1 | 1/2013 | Simske et al. |

(Continued)

FOREIGN PATENT DOCUMENTS

WO    2009154644 A1    12/2009

OTHER PUBLICATIONS

Sivakrishna Padavala et al., 'Super Resolution Image Reconstruction using LWT', In: a thesis for the degree of Master of Science in Electrical Engineering, Blekinge Institute of Technology, Nov. 2012.

(Continued)

*Primary Examiner* — Jeffery Williams
(74) *Attorney, Agent, or Firm* — IP Investment Law Group (57) ABSTRACT

An electronic system includes: a communication unit configured to provide an encoded bitstream; a storage unit, coupled to the communication unit, configured to implement a decoder including a frequency lifting module for lifting a frequency component based on a ratio; and a control unit, coupled to the storage unit, configured to generate an output coefficient for a current frame based on an output magnitude.

20 Claims, 7 Drawing Sheets

(56) References Cited

U.S. PATENT DOCUMENTS

2013/0114695 A1* 5/2013 Joshi .................. H04N 19/463
                                                        375/240.03
2013/0230096 A1     9/2013 Lasserre et al.

OTHER PUBLICATIONS

Walaa M. Abd-Elhafiez et al, "Hybrid Scheme for Lifting Based Image Coding", Seventh International Conference On Computer Engineering & Systems (ICCES), Nov. 27, 2012, pp. 141-146, copyright 2012 IEEE, ISBN: 978-1-4673-2961-3/12.

Liyakathunisa et al, "Super Resolution Reconstruction of Compressed Low Resolution Images Using Wavelet Lifting Schemes," Second International Conference On Computer and Electrical Engineering, Dec. 28, 2009, pp. 629-633, copyright 2009 IEEE, Piscataway, New Jersey, USA, ISBN: 978-0-7695-3925-6/09.

Lv Nana et al, "Super Resolution Video Reconstruction In DSP+FPGA Based On Lifting Wavelet," Tenth International Conference On Electronic Measurement & Instruments, Aug. 16, 2011, pp. 101-104, ISBN: 978-1-4244-8161-3/11, copyright IEEE.

European Search Report, Jul. 12, 2016, Application No. 14764581.6.

* cited by examiner

ELECTRONIC SYSTEM WITH FREQUENCY MECHANISM AND METHOD OF OPERATION THEREOF

CROSS-REFERENCE TO RELATED APPLICATIONS

This application claims the benefit of U.S. Provisional Patent Application Ser. No. 61/794,627 filed Mar. 15, 2013 and U.S. Provisional Patent Application Ser. No. 61/892,397 filed Oct. 17, 2013, and the subject matter thereof are incorporated herein by reference thereto.

TECHNICAL FIELD

An embodiment of the present invention relates generally to an electronic system, and more particularly to a system for frequency.

BACKGROUND

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

High-definition television broadcasting and video communications are becoming more and more common. Efficient compression of high definition digital image and video content is essential for its efficient transmission and storage. In the recent years, with the evolvement of High Definition (HD) video standard, such as HDTV and other high resolution video representation devices, there is an increasing demand for high definition video content.

At the same time, there is a significant lack of HD video content where the majority of TV channels and DVD movies are encoded with standard-definition (SD). Displaying SD video on HD or Ultra High Definition displays can result in poor images. Often images suffer from significant degradation of image quality particularly with compressed image data and lower frequency image data. Some poor images suffer from artifacts at the block boundaries and propagation of accumulated noise.

Thus, a need still remains for an electronic system with frequency mechanism to display three-dimensional images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a communication unit configured to provide an encoded bitstream; a storage unit, coupled to the communication unit, configured to implement a decoder including a frequency lifting module for lifting a frequency component based on a ratio; and a control unit, coupled to the storage unit, configured to generate an output coefficient for a current frame based on the output magnitude.

An embodiment of the present invention provides a method of operation of an electronic system including: providing, with a communication unit, an encoded bitstream; lifting a frequency component based on a ratio with a decoder including a frequency lifting module; and generating an output coefficient for a current frame based on an output magnitude.

An embodiment of the present invention provides a non-transitory computer readable medium including stored thereon instructions to be executed by a control unit comprising, including: providing an encoded bitstream; lifting a frequency component based on a ratio with a decoder including a frequency lifting module; and generating an output coefficient for a current frame based on an output magnitude.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

An embodiment of the present invention includes a Frequency Lifting Super Resolution (FLSR) combined with a video decoder where Discrete Cosine Transform (DCT) coefficients are already available and where the Inverse DCT (IDCT or $DCT^{-1}$) function is also available. Combining the FLSR with the video decoder can provide a hardware (HW) efficient implementation of FLSR technologies. The combination can also provide a way to implement FLSR based up-sampler with the video decoder in the frequency domain, which can provide outstanding up-scaled video quality based on Super-Resolution technology.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention.

However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which image information is expressed is not critical to some embodiments of the invention. For example, in some embodiments, image information is presented in the format of (X, Y); where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an intensity or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
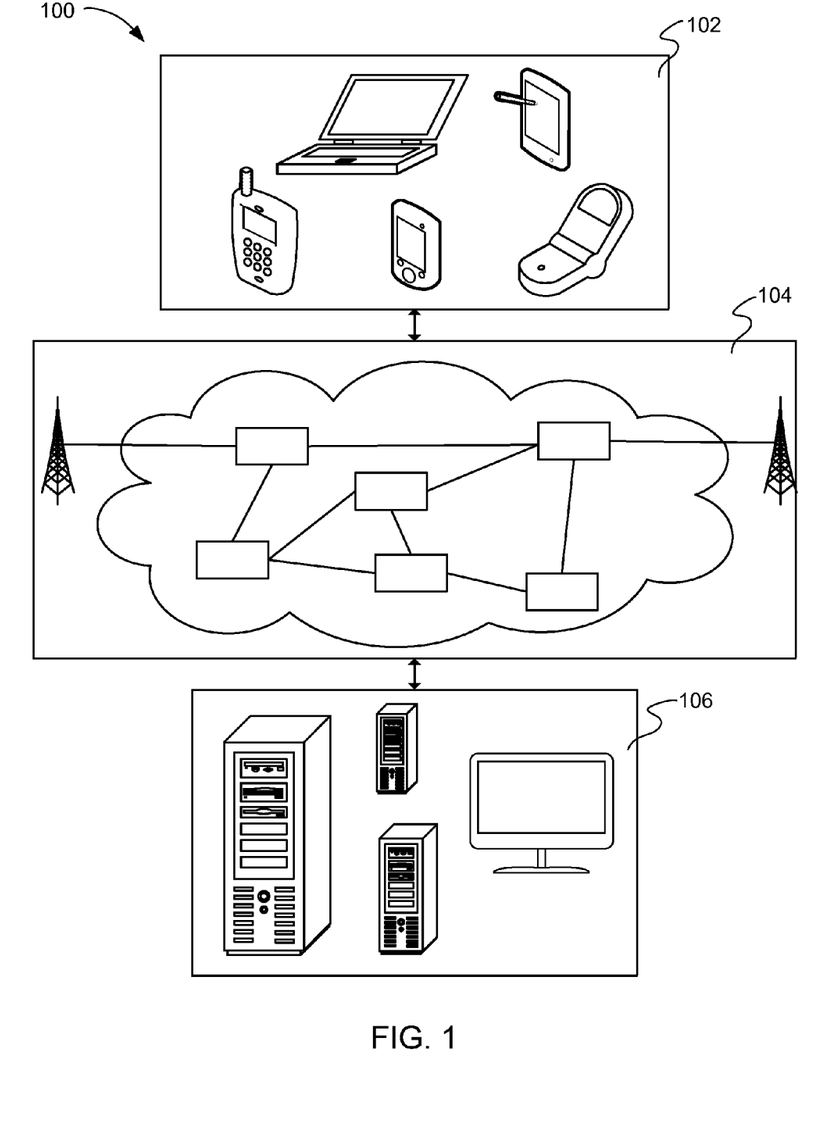
FIG. 1 is an electronic system with frequency mechanism in an embodiment of the present invention.

Referring now to FIG. 1, therein is shown an electronic system 100 with frequency mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 to communicate with the second device 106 or can be a stand-alone device.

For illustrative purposes, the electronic system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, an ultra high definition television, a three dimensional television, a smart television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, a television, a high definition television, an ultra high definition television, a smart television, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the electronic system 100 is described with the second device 106 as a computing device, although it is understood that the second device 106 can be different types of devices. Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
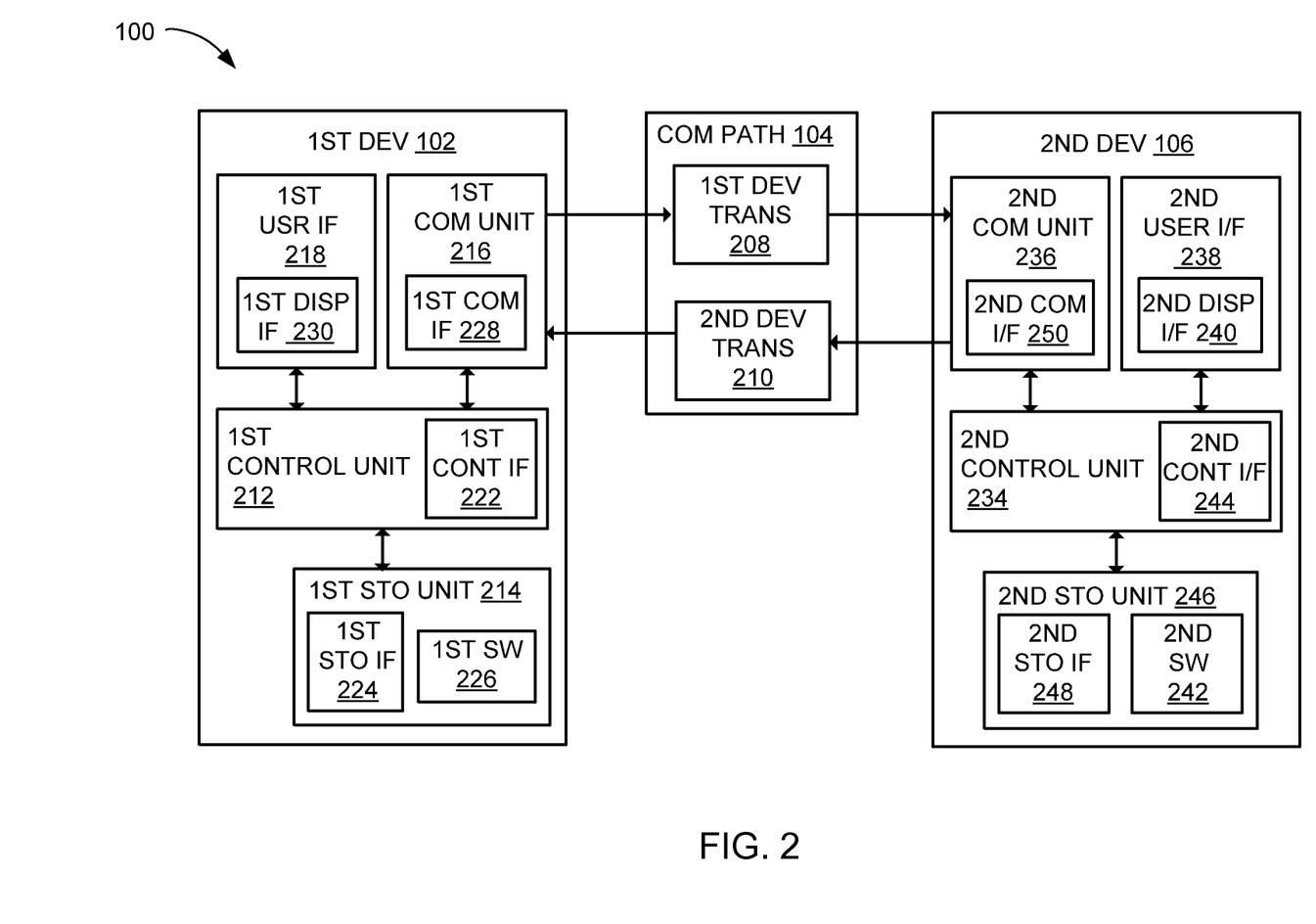
FIG. 2 is an exemplary block diagram of the electronic system.

Referring now to FIG. 2, therein is shown an exemplary block diagram of the electronic system 100. The electronic system 100 can include the first device 102, the communication path 104, and the second device 106. The first device 102 can send information in a first device transmission 208 over the communication path 104 to the second device 106.

The second device 106 can send information in a second device transmission 210 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a portable device and the second device 106 will be described as a display device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the electronic system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the electronic system 100. The first control unit 212 can also execute the first software 226 for the other functions of the electronic system 100. The first control unit 212 can further execute the first software 226 for interaction with the communication path 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, softkeys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The electronic system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100.

Figure 3:
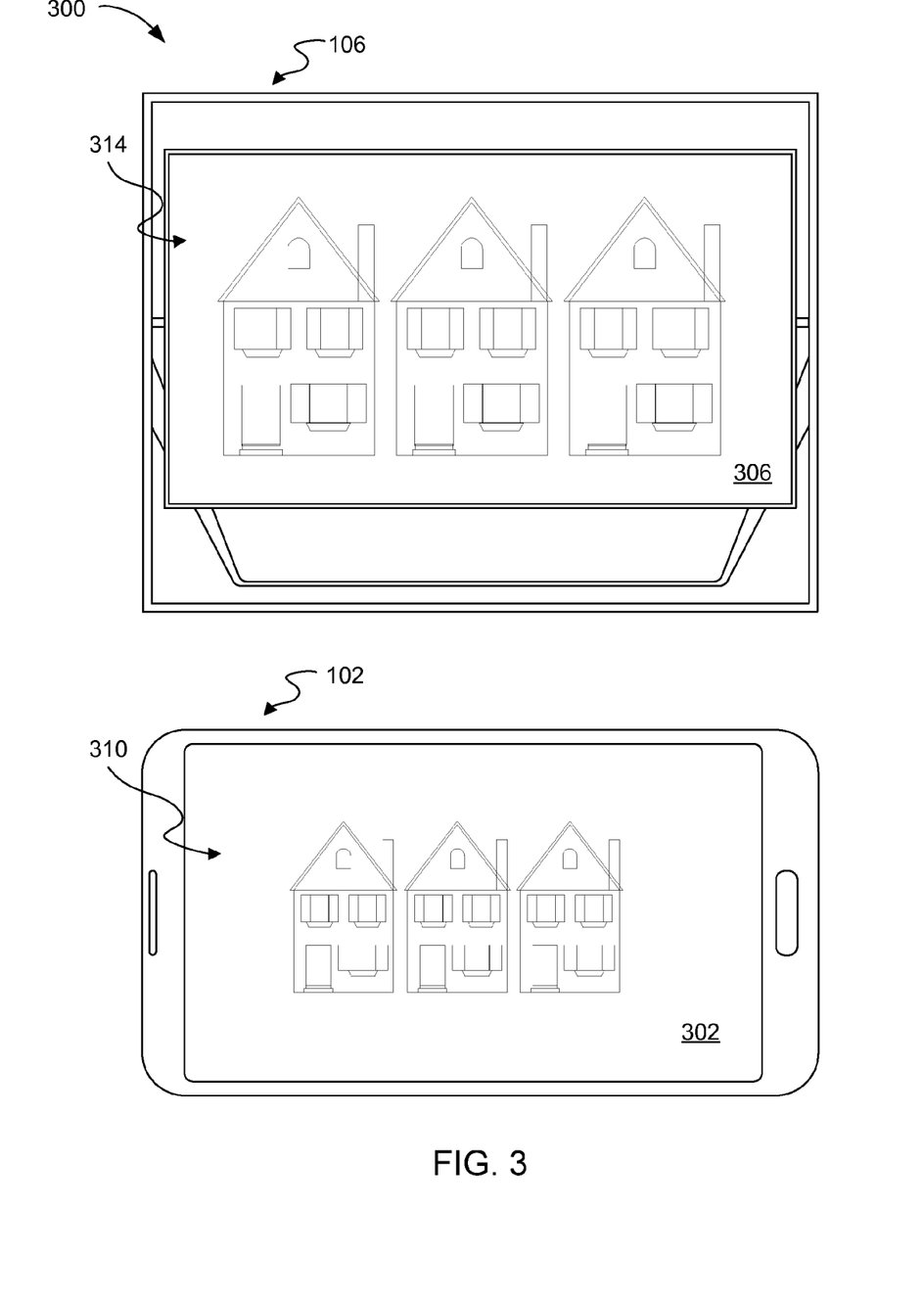
FIG. 3 is an example of display interfaces of the electronic system.

Referring now to FIG. 3, therein is shown an example of display interfaces of the electronic system 100. A first display interface 302 can be included in the first device 102 of FIG. 1, the second device 106 of FIG. 1, or combination thereof. Similarly a second display interface 306 can also be included in the second device 106 of FIG. 1, the first device 102 of FIG. 1, or combination thereof. The first device 102 can display a first image 310. Similarly, the second device can display a second image 314. For example, the first image 310 and the second image 314 can represent a same content displayed at different resolutions.

The first display interface 302, the second display interface 306, or combination thereof can provide Ultra High Definition (UD) output with Full High Definition (FHD) input or Standard Definition (SD) input. For example, 4K UDTV can include 3840 pixels by 2160 pixels with four times the resolution of FHDTV of 1920 pixels×1080 pixels, and 8K UDTV can include 7680 pixels by 4320 pixels with eight times the resolution of FHDTV. For illustrative purposes, the first device 102 has a shape of a smart phone although it is understood that the first device 102 may be any device. Further for illustrative purposes, the second device 106 has a shape of a UDTV although it is understood that the second device 106 may be any device.

The first display interface 302, the second display interface 306, or combination thereof can display an image, text, a symbol, or combination thereof. The image, the text, or the symbol can represent content including video, photos, drawings, or combination thereof. Objects including the image, the text, or the symbol can optionally be radio buttons, selectable, clickable, static, or combination thereof. The content represented by the objects, specific to preferences, selections, viewing time, or combination thereof, can preferably include links to other pages in the same other documents, web sites, web pages, pages in the same document, context, application, or ecosystem.

Selecting, clicking, or activating, the objects preferably provides navigation or access to related content. The symbols can also be consistent with the related content and can change dynamically based on the related content, selection, activation, or combination thereof. For example, different size, shape, color, configuration, or combination thereof, can distinguish the symbol for playing content, the symbol for getting more information, the symbols for buying a service, or the symbols for buying a product.

For illustrative purposes, the first display interface 302 and the second display interface 306 are described with the objects that can selected, clicked, or activated for navigation or access to related content although it is understood that hands free activation or navigation such as contextually relevant speech controls may also be used. Similarly, a user of the content may designate content to be read aloud in a predefined language.

Figure 4:
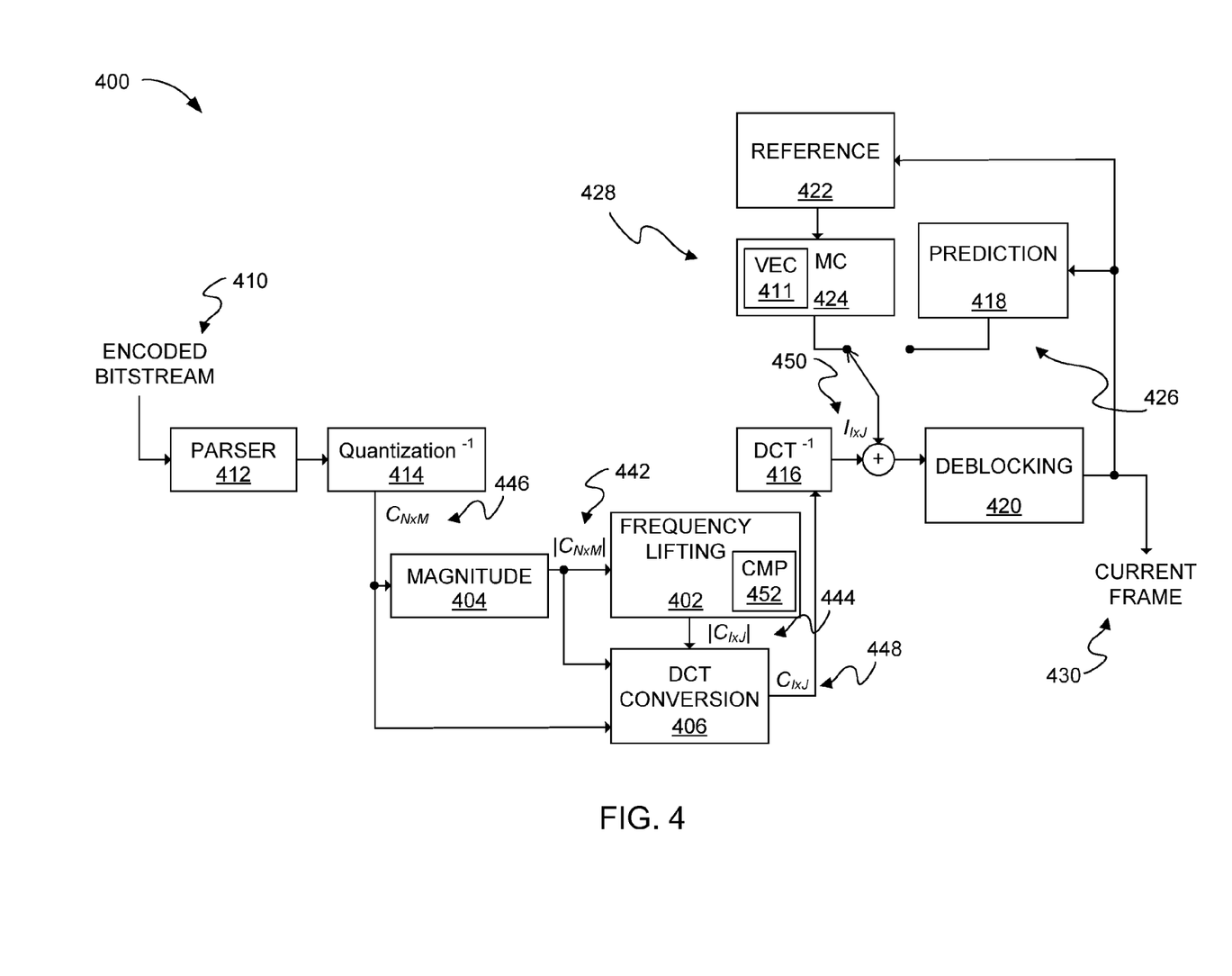
FIG. 4 is an exemplary control flow of a decoder of the electronic system.

Referring now to FIG. 4, therein is shown an exemplary control flow of a decoder 400 of the electronic system 100. The decoder 400 can include a frequency lifting module 402 such as a Frequency Lifting Super Resolution (FLSR) module 402, which receives input from a Magnitude module 404 that also provides input to a Conversion module 406 such as a Discrete Cosine Transform (DCT) conversion or transformation module. The frequency lifting module 402 provides up-scaling with high quality based on Super-Resolution technology.

The decoder 400 can receive an encoded bitstream 410, including motion vectors 411, with a Parser module 412. The Parser can provide input to the Magnitude module 404, an Inverse Quantization module 414, an Inverse Discrete Cosine Transform (DCT) module 416, such as an Inverse DCT module or a $DCT^{-1}$ module, or combination thereof.

A Prediction module 418 such as an Intra Prediction module, an Inter Prediction module, or combination thereof, can optionally receive input from a Deblocking module 420 such as a Deblocking Filter Module. The Prediction module 418 can also receive input from the Inverse Discrete Cosine Transform (DCT) module 416 without a need for the Deblocking module 420. The Prediction module 418 can determine and implement an Intra Prediction mode 426 or an Inter Prediction mode 428 including a Reference module 422 such as a Reference Frame Buffer module, and a Motion module 424 such as a motion estimation module, a motion compensation module, or combination thereof.

A block-based motion-compensated video compression method, such as H.264 can include a decoder process. A decoder such as a video decoder receives the encoded bitstream 410, such as a compressed bitstream or H.264, decodes each of the syntax elements and extracts the information such as quantized transform coefficients, prediction information, other data, or combination thereof, by the parser module 412. The Inverse Quantization module 414 and the Inverse Discrete Cosine Transform ($DCT^{-1}$) module 416 can receive the decoded information to reverse the coding process and to recreate a sequence of video images.

The result of the reversed coding can be augmented or added based on a mode of the Prediction module 418, which can include the Intra Prediction mode 426 with macro blocks from a same image for prediction, the Inter Prediction mode 428 with reduced temporal correlation using motion estimation and compensation of the Motion module 424, or combination thereof. The Motion module 424 can also extract the motion vectors 411 from the encoded bitstream 410 for processing.

The Deblocking module 420 can optionally process blocking artifacts caused by block-based transform in intra-prediction coding, inter-prediction coding, quantization processing, or combination thereof. A Deblocking filter of the Deblocking module 420 can optionally reduce the artifacts at the block boundaries and prevent the propagation of accumulated noise in a current frame 430.

The frequency lifting module 402, such as a Frequency Lifting Super Resolution (FLSR) module 402, can preferably be coupled to the Inverse Quantization module 414 and the Inverse Discrete Cosine Transform (DCT$^{-1}$) module 416. For example, the frequency lifting module 402, the Parser module 412, the Deblocking module 420, or combination thereof can share the DCT$^{-1}$ module 416 including functions, such as Discrete Cosine Transform (DCT), Inverse Discrete Cosine Transform (IDCT or DCT$^{-1}$), or combination thereof. For illustrative purposes the frequency lifting module 402 can be inserted between the Inverse Quantization module 414 and the DCT$^{-1}$ module 416 although it is understood that any configuration may be used.

The frequency lifting module 402, such as a Frequency Lifting Super Resolution (FLSR) module 402, can receive a de-quantized Discrete Cosine Transform (DCT) coefficients magnitude 442, such as ($|C_{N \times M}|$) or a dequantized coefficient magnitude 442, provided by the Magnitude module 404. For example, the de-quantized DCT coefficients matrix can be N×M up-scaled to I×J (where I>N and J>M) by a frequency lifting operation to provide upscaled output, such as the current frame 430, of the input, such as the encoded bitstream 410. Further for example, the upscale output can include Ultra High Definition (UD) output with Full High Definition (FHD) input.

The frequency lifting module 402, such as a Frequency Lifting Super Resolution (FLSR) module 402, can provide an output stretched coefficient magnitude 444, such as an output magnitude 444, ($|C_{I \times J}|$), a lifted coefficient magnitude 444, or a stretched coefficient magnitude 444, of the Conversion module 406. The output stretched coefficient magnitude 444 can be combined with the de-quantized DCT coefficient 446 such as ($C_{N \times M}$) and its magnitude 442 ($|C_{N \times M}|$) for the stretched DCT coefficients, in a manner similar to a detailed formula for horizontal and vertical DCT frequencies described in FIG. 7 such as with the following formula:

$$C_{I \times J} = C_{N \times M} \cdot \frac{|C_{I \times J}|}{|C_{N \times M}|}$$

The DCT coefficient for the output stretched coefficient 448, such as an output coefficient 448 or ($C_{I \times J}$), can be provided to the Inverse Discrete Cosine Transform (DCT$^{-1}$) module 416, the output stretched coefficient 448 generated by the Conversion module 406 based on the output stretched coefficient magnitude 444. The DCT$^{-1}$ module 416 can provide a "detail added" up-scaled block Discrete Cosine Transform (DCT) coefficient 450 such as ($I_{I \times J}$), with a change of macro block size for motion compensation or intra prediction.

The frequency lifting module 402 can lift frequency components 452 based on a ratio such as an upscale ratio. The frequency components 452 can include the de-quantized Discrete Cosine Transform (DCT) coefficients magnitude 442, the output stretched coefficient magnitude 444, the de-quantized DCT coefficient 446, the output stretched coefficient 448, any frequency component, or combination thereof. The ratio can include an upscale ratio from N×M to I×J (where I>N and J>M).

It has been discovered that a Super-Resolution based Up-scaler can include the frequency lifting module 402, such as a Frequency Lifting Super Resolution (FLSR) module 402, inside a decoder 400 such as an H.264 video decoder. The decoder 400 can provide can provide up-scaling for high quality video based on Super-Resolution technology with efficient hardware cost in part due to reduced complexity. For example, the frequency lifting module 402 can share functions, such as Discrete Cosine Transform (DCT), Inverse Discrete Cosine Transform (IDCT or DCT$^{-1}$), or combination thereof, with the decoder 400.

Further it has been discovered that the frequency lifting module 402, such as a Frequency Lifting Super Resolution (FLSR) module 402, without up-scaling can provide highly vivid details. The frequency lifting module 402 provides frequency lifting based detail restoration with or without up-scaling.

Figure 5:
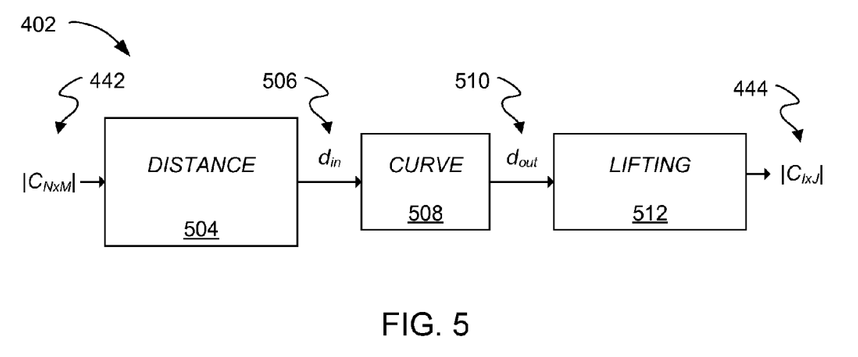
FIG. 5 is an exemplary control flow of the Frequency Lifting Super Resolution (FLSR) module of FIG. 4.

Referring now to FIG. 5, therein is shown an exemplary control flow of the frequency lifting module 402 of FIG. 4, such as a Frequency Lifting Super Resolution (FLSR) module 402. The frequency lifting module 402 can include a Distance module 504 such as a Distance to Zero Frequency module, a Curve module 508, and a Lifting module 508 such as a Lifting Mapping module.

The Distance module 504 can calculate a distance for every frequency element to a zero frequency point. The de-quantized Discrete Cosine Transform (DCT) coefficients magnitude 442, such as ($|C_{N \times M}|$), can be provided to the Distance module 504, which can provide a distance in 506, such as ($d_{in}$).

Figure 6:
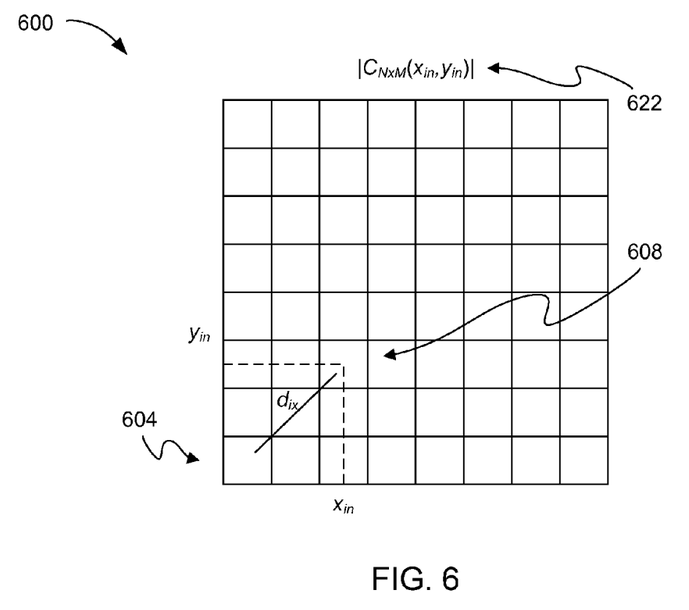
FIG. 6 is an exemplary diagram representing frequency lifting of the electronic system.

The Curve module 508 can provide a curve 704 or pre-determined transfer function 704 for the distance for every frequency point 608 of FIG. 6 to a zero frequency point 604 of FIG. 6. The distance in 506, such as ($d_{in}$), can be provided to the Curve module 508, which can provide a distance out 510, such as ($d_{out}$).

The Lifting module 512 can lift or map the de-quantized Discrete Cosine Transform (DCT) coefficients magnitude 442, such as ($|C_{N \times M}|$), to the output stretched coefficient magnitude 444, such as ($|C_{I \times J}|$).

For every element of $|C_{N \times M}(x_{in}, y_{in})|$ where $x_{in}=0, 1, \ldots, N-1$ and $y_{in}=0, 1, \ldots, M-1$, a distance to a zero frequency point is calculated. The distance to the zero frequency point can be calculated, such as with the following formula:

$$d_{in} = \sqrt{x_{in}^2 + y_{in}^2}$$

A larger value of $d_{in}$ can represent a higher frequency. The higher frequency can be output from the Distance module 504 and input to the Curve module 508 for further processing.

It has been discovered that the Lifting module 512 provides a super resolution frequency lifted, up-scaled, uplifted, enhanced, stretched, or combination thereof. The super resolution frequency such as the output stretched coefficient magnitude 444 provides up-scaling for high quality video based on Super-Resolution technology.

Referring now to FIG. 6, therein is shown an exemplary diagram 600 representing frequency lifting of the electronic system 100. The frequency lifting module 402 of FIG. 4, such as a Frequency Lifting Super Resolution (FLSR) module 402, including the Distance module 504, the Curve module 508, and the Lifting module 508, can provide the frequency lifting.

The frequency lifting can include a distance calculated from a zero frequency point 604 to a frequency point 608, such as an element 622 of $|C_{N \times M}(x_{in}, y_{in})|$. The frequency lifting can fill in each of the frequency points 608 of empty frequency area or empty frequency components 452 between N×M such as the de-quantized DCT coefficient 446

($C_{N \times M}$), and I×J such as the output stretched coefficient 448 ($C_{I \times J}$), in manner similar to a general formula for combining the output stretched coefficient magnitude 444 ($|C_{I \times J}|$), the de-quantized DCT coefficient 446 ($C_{N \times M}$), and its magnitude 442 ($|C_{N \times M}|$), described in FIG. 4. For illustrative purposes, frequency is shown with M=N=8 although it is understood that any value or values may be used.

Figure 7:
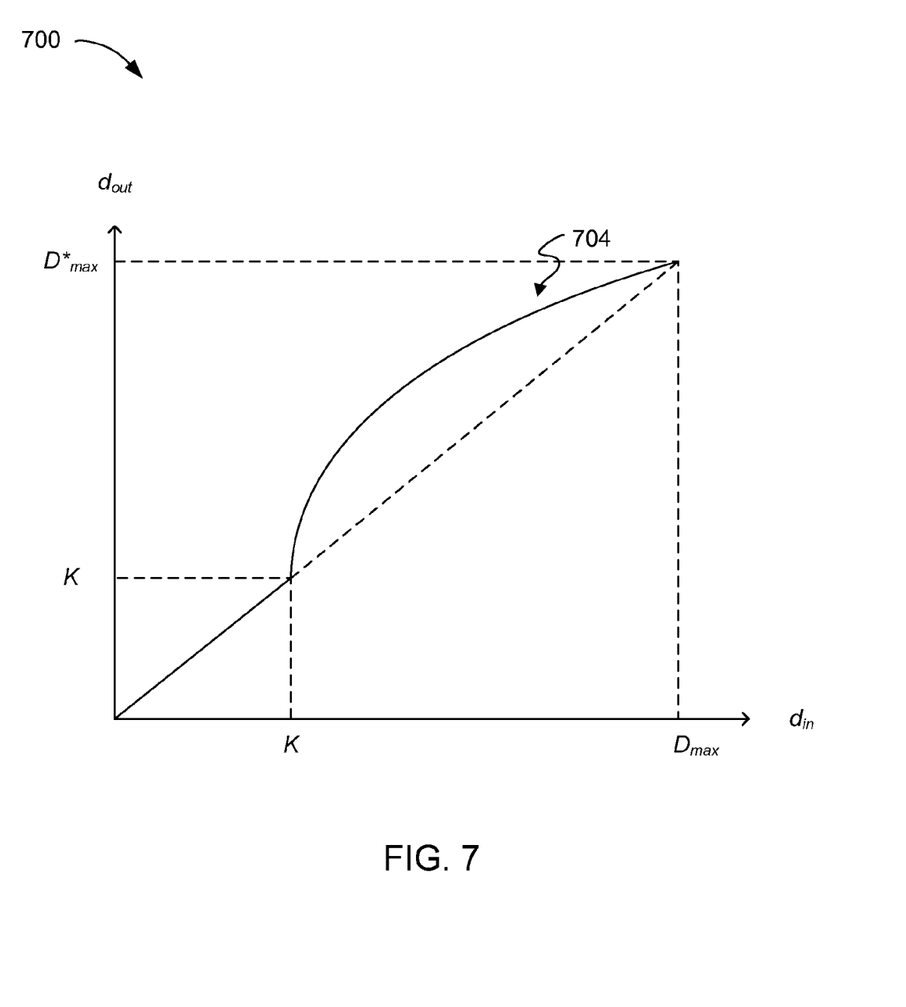
FIG. 7 is an exemplary graph representing frequency lifting of the electronic system.

Referring now to FIG. 7, therein is shown an exemplary graph 700 representing frequency lifting of the electronic system 100. The frequency lifting module 402 of FIG. 4, such as a Frequency Lifting Super Resolution (FLSR) module 402, including the Distance module 504, the Curve module 508, and the Lifting module 508, can provide the frequency lifting.

The frequency lifting can include calculating an upper target lifting frequency. An upper target lifting frequency distance to zero-frequency component can be represented as $d_{out}$=curve($d_{in}$), where the "curve" is a pre-determined transfer function 704, and where $D_{max} = \sqrt{N^2 + M^2}$ and $D_{max}^* = \sqrt{I^2 + J^2}$ are the values that are associated with the maximum distances of the de-quantized Discrete Cosine Transform (DCT) coefficients magnitude 442, such as ($|C_{N \times M}|$), and the output stretched coefficient magnitude 444 such as ($|C_{I \times J}|$) to the zero frequency point, respectively.

Based on the target lifting factor, the associated horizontal DCT frequency component and the associated vertical DCT frequency component can be calculated in manner similar to a general formula for combining the output stretched coefficient magnitude 444, the de-quantized DCT coefficient 446, and its magnitude 442, described in FIG. 4, such as with the following formula:

$$x_{out} = x_{in} \cdot \frac{d_{out}}{d_{in}} \ \& \ y_{out} = y_{in} \cdot \frac{d_{out}}{d_{in}}$$

The associated horizontal DCT frequency components and the associated vertical DCT frequency components can be shifted into the same angle such that $$\frac{y_{in}}{x_{in}} = \frac{y_{out}}{x_{in}}.$$

Based on the target horizontal and target vertical frequency components, the frequency components 452 can be lifted from the de-quantized Discrete Cosine Transform (DCT) coefficients magnitude 442 of FIG. 4, such as ($|C_{N \times M}|$), to output stretched coefficient magnitude 444 of FIG. 4 such as ($|C_{I \times J}|$), such as with the following formula:

$$|C_{I \times J}|(x_{out}, y_{out}) = |C_{N \times M}(x_{in}, y_{in})|$$

The frequency lifting module 402, such as a Frequency Lifting Super Resolution (FLSR) module 402, lifts or shifts each frequency component 452 to a higher frequency location in a spectrum. 2D DCT coefficients or spectrum can be plotted as a curved surface in a 3D Cartesian coordinate system with an origin representing a zero-frequency position. The frequency lifting or shifting process can move off-center peaks outward from the origin and expand a slope of a central peak outward.

It has been discovered that the electronic system 100 with the frequency lifting module 402, such as a Frequency Lifting Super Resolution (FLSR) module 402, provides outstanding up-scaled video quality. The frequency lifting module 402 calculates horizontal DCT frequency components and vertical DCT frequency components that can be shifted into a same angle provided significantly improved lifting or shifting of each frequency component 452.

Figure 8:
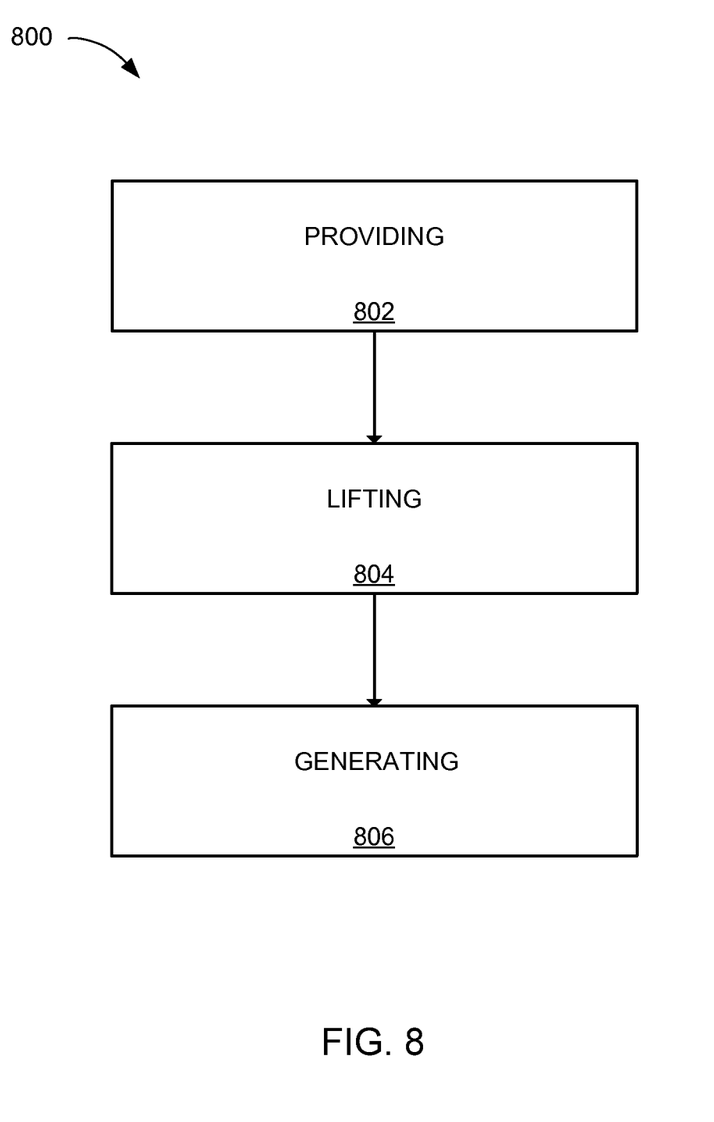
FIG. 8 is a flow chart of a method of operation of an electronic system in an embodiment of the present invention.

Referring now to FIG. 8, therein is shown a flow chart of a method 500 of operation of an electronic system 100 in an embodiment of the present invention. The method 500 includes: providing, with a communication unit, an encoded bitstream in a block 802; lifting a frequency component based on a ratio with a decoder including a frequency lifting module in a block 804; and generating an output coefficient for a current frame based on an output magnitude in a block 806.

The frequency lifting module 402 can be implemented by the first control unit 212, the second control unit 234, the first storage unit 214, the second storage unit 246, or combination thereof. The frequency lifting 402 module can be coupled to the Magnitude module 404, the Conversion module 406, the Parser module 412, the Inverse Quantization module 414, the Inverse DCT module 416, the Prediction module 418, the Deblocking module 420, the Reference module 422, the Motion module 424, or combination thereof.

The Magnitude module 404 can be implemented the first control unit 212, the second control unit 234, the first storage unit 214, the second storage unit 246, or combination thereof. The Magnitude module 404 can be coupled to the frequency lifting module 402, the Conversion module 406, the Parser module 412, the Inverse Quantization module 414, the Inverse DCT module 416, the Prediction module 418, the Deblocking module 420, the Reference module 422, the Motion module 424, or combination thereof.

The Conversion module 406 can be implemented by the first control unit 212, the second control unit 234, the first storage unit 214, the second storage unit 246, or combination thereof. The Conversion module 406 can be coupled to the frequency lifting module 402, the Magnitude module 404, the Parser module 412, the Inverse Quantization module 414, the Inverse DCT module 416, the Prediction module 418, the Deblocking module 420, the Reference module 422, the Motion module 424, or combination thereof.

The Parser module 412 can be implemented by the first control unit 212, the second control unit 234, the first storage unit 214, the second storage unit 246, the first communication unit 216, the second communication unit 236, or combination thereof. The Parser module 412 can be coupled to the frequency lifting module 402, the Magnitude module 404, the Conversion module 406, the Inverse Quantization module 414, the Inverse DCT module 416, the Prediction module 418, the Deblocking module 420, the Reference module 422, the Motion module 424, or combination thereof.

The Inverse Quantization module 414 can be implemented by the first control unit 212, the second control unit 234, the first storage unit 214, the second storage unit 246, or combination thereof. The Inverse Quantization module 414 can be coupled to the frequency lifting module 402, the Magnitude module 404, the Conversion module 406, the Parser module 412, the Inverse DCT module 416, the Prediction module 418, the Deblocking module 420, the Reference module 422, the Motion module 424, or combination thereof.

The Inverse DCT module 416 can be implemented by the first control unit 212, the second control unit 234, the first storage unit 214, the second storage unit 246, or combination thereof. The Inverse DCT module 416 can be coupled to the frequency lifting module 402, the Magnitude module 404, the Conversion module 406, the Parser module 412, the Inverse Quantization module 414, the Prediction module 418, the Deblocking module 420, the Reference module 422, the Motion module 424, or combination thereof.

The Prediction module 418 can be implemented by the first control unit 212, the second control unit 234, the first storage unit 214, the second storage unit 246, or combination thereof. The Prediction module 418 can be coupled to the frequency lifting module 402, the Magnitude module 404, the Conversion module 406, the Parser module 412, the Inverse Quantization module 414, the Inverse DCT module 416, the Deblocking module 420, the Reference module 422, the Motion module 424, or combination thereof.

The Prediction module 418, implemented by the first control unit 212, the second control unit 234, the first storage unit 214, the second storage unit 246, or combination thereof, can determine and implement the Intra Prediction mode 426, the Inter Prediction mode 428, or combination thereof. Thus the Intra Prediction mode 426 and the Inter Prediction mode 428 can be implemented by the first control unit 212, the second control unit 234, the first storage unit 214, the second storage unit 246, or combination thereof.

The Deblocking module 420 can be implemented by the first control unit 212, the second control unit 234, the first storage unit 214, the second storage unit 246, or combination thereof. The Deblocking module 420 can be coupled to the frequency lifting module 402, the Magnitude module 404, the Conversion module 406, the Parser module 412, the Inverse Quantization module 414, the Inverse DCT module 416, the Prediction module 418, the Reference module 422, the Motion module 424, or combination thereof.

The Reference module 422 can be implemented by the first control unit 212, the second control unit 234, the first storage unit 214, the second storage unit 246, or combination thereof. The Reference module 422 can be coupled to the frequency lifting module 402, the Magnitude module 404, the Conversion module 406, the Parser module 412, the Inverse Quantization module 414, the Inverse DCT module 416, the Prediction module 418, the Deblocking module 420, the Motion module 424, or combination thereof.

The Motion module 424 can be implemented by the first control unit 212, the second control unit 234, the first storage unit 214, the second storage unit 246, or combination thereof. The Motion module 424 can be coupled to the frequency lifting module 402, the Magnitude module 404, the Conversion module 406, the Parser module 412, the Inverse Quantization module 414, the Inverse DCT module 416, the Prediction module 418, the Deblocking module 420, the Reference module 422, or combination thereof.

The modules described in this application can be implemented as instructions stored on a non-transitory computer readable medium to be executed by a first control unit 212 of FIG. 2, the second control unit 234 of FIG. 2, or a combination thereof. The non-transitory computer medium can include the first storage unit 214 of FIG. 2, the second storage unit 246 of FIG. 2, or a combination thereof. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

The modules described in this application can be part of the first software 226 of FIG. 2, the second software 242 of FIG. 2, or a combination thereof. These modules can also be stored in the first storage unit 214 of FIG. 2, the second storage unit 246 of FIG. 2, or a combination thereof. The first control unit 212, the second control unit 234, or a combination thereof can execute these modules for operating the electronic system 100.

The electronic system 100 has been described with module functions or order as an example. The electronic system 100 can partition the modules differently or order the modules differently. For example, the frequency lifting module 402 can include the Distance module 504, Curve module 508, and the Lifting module 508 as separate modules although these modules can be combined into one. Also, the Inverse DCT module 416 can be split into separate modules for implementing the Discrete Cosine Transform (DCT) and Inverse Discrete Cosine Transform (IDCT or $DCT^{-1}$) in the separate modules.

The modules described in this application can be hardware implementation, hardware circuitry, or hardware accelerators in the first control unit 212 of FIG. 2 or in the second control unit 234 of FIG. 2. The modules can also be hardware implementation, hardware circuitry, or hardware accelerators within the first device 102 or the second device 106 but outside of the first control unit 212 or the second control unit 234, respectively.

The electronic system 100 has been described with module functions or order as an example. The electronic system 100 can partition the modules differently or order the modules differently. For example, the Motion module 424 can be implemented before the Prediction module 418 or the Reference module 422.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
 a communication unit configured to provide an encoded bitstream;
 a storage unit, coupled to the communication unit, configured to store a decoder including a frequency lifting module for lifting a frequency component based on a ratio; and
 a control unit, coupled to the storage unit, configured to:
  generate an output coefficient for a current frame based on an output magnitude; and
  fill in a frequency point of a lifted coefficient magnitude from a de-quantized coefficient magnitude.

2. The system as claimed in claim 1 wherein the control unit is configured to calculate a distance for a frequency point of an element to a zero frequency point.

3. The system as claimed in claim 1 wherein the control unit is configured to calculate a curve for a frequency point of an element to a zero frequency point.

4. The system as claimed in claim 1 wherein the control unit is configured to fill in each frequency point of the lifted coefficient magnitude from the de-quantized coefficient magnitude.

5. The system as claimed in claim 1 wherein the control unit is configured to provide an up-scaled block coefficient.

6. The system as claimed in claim 1 wherein the storage unit is configured to implement an Intra Prediction mode with macro blocks from a same image.

7. The system as claimed in claim 1 wherein the storage unit is configured to implement an Inter Prediction mode with a motion vector extracted from the encoded bitstream.

8. A method of operation of an electronic system comprising:
providing, with a communication unit, an encoded bitstream;
lifting a frequency component based on a ratio with a decoder including a frequency lifting module;
generating an output coefficient for a current frame based on an output magnitude; and
filling in a frequency point of a lifted coefficient magnitude from a de-quantized coefficient magnitude.

9. The method as claimed in claim 8 further comprising calculating a distance for a frequency point of an element to a zero frequency point.

10. The method as claimed in claim 8 further comprising calculate a curve for a frequency point of an element to a zero frequency point.

11. The method as claimed in claim 8 further comprising filling in each frequency point of the lifted coefficient magnitude from the de-quantized coefficient magnitude.

12. The method as claimed in claim 8 further comprising providing an up-scaled block coefficient.

13. The method as claimed in claim 8 further comprising implementing an Intra Prediction mode with macro blocks from a same image.

14. The method as claimed in claim 8 further comprising implement an Inter Prediction mode with a motion vector extracted from the encoded bitstream.

15. A non-transitory computer readable medium including stored thereon instructions to be executed by a control unit comprising:
providing an encoded bitstream;
lifting a frequency component based on a ratio with a decoder including a frequency lifting module;
generating an output coefficient for a current frame based on the output and
filling in a frequency point of a lifted coefficient magnitude from a de-quantized coefficient magnitude.

16. The medium as claimed in claim 15 further comprising calculating a distance for a frequency point of an element to a zero frequency point.

17. The medium as claimed in claim 15 further comprising calculate a curve for a frequency point of an element to a zero frequency point.

18. The medium as claimed in claim 15 further comprising filling in each frequency point of the lifted coefficient magnitude from the de-quantized coefficient magnitude.

19. The medium as claimed in claim 15 further comprising implementing an Intra Prediction mode with macro blocks from a same image.

20. The medium as claimed in claim 15 further comprising implement an Inter Prediction mode with a motion vector extracted from the encoded bitstream.

* * * * *